Patented Apr. 8, 1930

1,754,116

UNITED STATES PATENT OFFICE

FRANCIS MEUNIER, OF HYON LES MONS, BELGIUM, ASSIGNOR TO LA SOUDURE ELECTRIQUE AUTOGENE S. A., OF BRUSSELS, BELGIUM

ELECTRODE SUITABLE FOR ARC WELDING

No Drawing. Application filed March 8, 1929, Serial No. 345,620, and in France March 12, 1928.

The known coatings for electrodes suitable for arc welding, consist of refractory materials, which are usually natural or artificial silicates obtained by mixing alkaline earths with alkaline silicates in solution.

The electrodes thus coated are characterized by a melting point more or less elevated.

On the other hand, it is known that with direct or alternating current, of the usual intensity, the working tension necessary between the article to be welded and the electrode is limited to between 20 and 30 volts, whereas the tension necessary at the terminals is much greater, varying between 60 to 80 volts according to the composition of the coating. With coatings having a base of chalk or other very refractory earths, 80 volts must be used, whereas about 60 volts are sufficient with more-fusible coatings, especially with those having a base of iron oxide.

The dynamos and transformers used in welding must therefore be constructed for the maximum tension when starting, but they only use one-fourth of their power when working. Thus a poor coefficient of efficiency results for the machines. Furthermore, with an alternating current, this situation creates a poor coefficient of power, because the coefficient is proportional to the ratio of the working tension to the starting tension.

The present invention has for its object to reduce considerably the starting tension of welding arcs and to improve the coefficient of power, when welding with alternating current.

This result is obtained by adding to the materials forming the coating, and in small quantities, one or several oxy-acid salts, and especially those of the alkali and alkaline earth metals, such as nitrates, chlorates, bromates, etc., and the corresponding per-salts, as well as the less-oxygenated compounds, such as nitrites, chlorites, etc., which decompose rapidly when incandescent, with evolution of oxygen. The result claimed by the invention is the more marked according as the salt used is the more easily decomposed by heat and has a greater content of a metal with a low ionization potential, such as, for example, potassium nitrate.

The useful result desired is obtained by the addition of a small quantity only of the salts above mentioned. A more considerable addition would injure the mechanical properties of the metal. It is sufficient to add a mean of 2 to 3% of the salts indicated.

For an electrode whose coating had the following chemical composition:

| | Per cent |
|---|---|
| Calcium carbonate | 35 |
| Siliceous chalk | 35 |
| Magnesium carbonate | 30 | the starting tension was about 70 volts.

With an addition of 3% of potassium nitrate to the same coating, the starting tension was reduced to about 40 volts.

The addition of the salts proposed does not alter the speed of fusion of the electrode and of the slag, the arc being well ionized, more supple and the welding operation facilitated.

Experience has also shown that it is possible to add a slightly larger quantity of the ionizing salt (for instance 5%) on condition of also adding to the coating the metal which constitutes the core of the electrode, in a finely divided state and in sufficient quantity (for instance 10%) to combine the oxygen disengaged by the oxidizing salt.

For instance, for welding with the help of a rod of mild steel, an additional mixture of 5% of potassium nitrate and 10% of iron or steel filings may be used.

The invention as described, can notably be used with electrodes whose core is an alloy or a non-ferrous metal. The metallic substances added in a finely divided state may in this case consist of the alloy or of several constituents of the alloy.

I claim as my invention:

1. An arc-welding electrode, comprising a rod having a coating containing 3-5% of alkali metal nitrates.

2. An arc-welding electrode, comprising a rod having a coating containing 3-5% of alkali metal nitrates and about 10% of finely-divided metal of the rod.

FRANCIS MEUNIER.